Oct. 5, 1937.           C. A. SABBAH           2,094,820
ELECTRIC VALVE CONVERTING SYSTEM
Filed July 8, 1936

Inventor:
Camil A. Sabbah, Deceased.
by William A. Dodge, Administrator,
by  Harry E. Dunham
        Attorney.

Patented Oct. 5, 1937

2,094,820

UNITED STATES PATENT OFFICE 2,094,820

ELECTRIC VALVE CONVERTING SYSTEM

Camil A. Sabbah, deceased, late of Schenectady, N. Y., by William A. Dodge, administrator, Schenectady, N. Y., assignor to General Electric Company, a corporation of New York Application July 8, 1936, Serial No. 89,592

8 Claims. (Cl. 175—363)

This invention relates to electric valve converting systems and more particularly to such systems suitable for transferring energy between an alternating current circuit and a direct current circuit, one of which has a constant current characteristic.

An electric valve converting system suitable for transferring energy between an alternating current circuit and a direct current circuit one of which has a constant current characteristic is disclosed in United States Letters Patent No. 1,961,080, granted May 29, 1934, upon the application of C. A. Sabbah. The apparatus disclosed therein utilizes a three-legged reactor having inductive windings on the various legs thereof and an energy storage device or capacitor associated with at least a portion of the inductive winding on each leg.

One of the objects of this invention is to provide an improved electric valve converting system of this type utilizing a minimum of apparatus and which will be reliable in operation.

The novel features which are believed to be characteristic of this invention are set forth with particularity in the appended claims. The invention itself, however, both as to its organization and method of operation, together with further objects and advantages thereof will be better understood by reference to the following description taken in connection with the accompanying drawing in which Fig. 1 represents the preferred embodiment of the invention, and Fig. 2 illustrates certain operating characteristics thereof.

Figure 1:
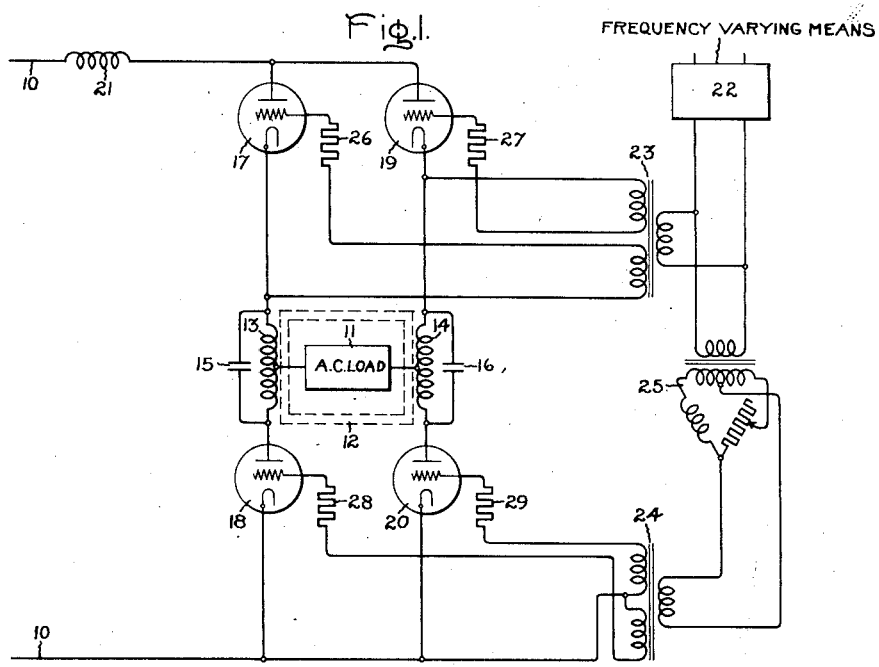
Figure 2:
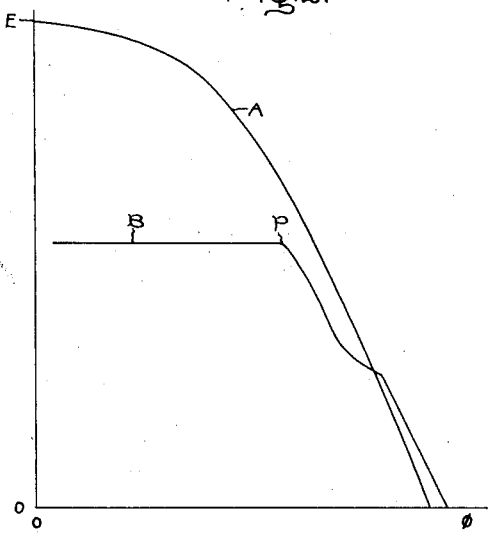

Referring now more particularly to Fig. 1 of the drawing, there is illustrated an electric valve converting system for transferring energy between the direct current circuit 10 and an alternating current circuit 11 indicated by the legend "A. C. load". The system is provided with an energy storage and transfer device comprising a two-legged magnetic core structure 12 represented by dotted lines and having inductive windings 13 and 14 on the legs thereof. Each of the windings is provided with an energy storage device which may be in the form of capacitors 15 and 16, each connected in parallel with the winding or at least in parallel with a portion of said winding. Each of the terminals of the windings 13 and 14 is connected by an electric discharge valve means to a direct current circuit 10. As illustrated, the winding 13 is connected by means of the valves 17 and 18 across the direct current circuit 10 and likewise winding 14 is connected across the direct current circuit 10 by means of valves 19 and 20. While each of the valves 17, 18, 19 and 20 is shown as being provided with an anode, a cathode and a control grid, these valves may be any of the several types well known in the art, although it is preferable to utilize valves of the type containing an ionizable medium and which are provided with control or starting electrodes whereby the discharge paths between the anodes and cathodes may be controlled. In order to prevent any reaction between the electric valve converting apparatus and the direct current circuit, the smoothing inductor 21 may be connected between the apparatus and the direct current circuit 10. The control electrodes or grids of the valves 17, 18, 19 and 20 are energized from a suitable source of alternating current 22 which is such as would be derived from a generator or an oscillator, the frequency of which may be readily varied. The control electrode circuits or grid circuits are connected to the source of alternating current 22 by means of the transformers 23 and 24, and in order to provide a means for controlling the phase relation between the alternating potential impressed upon the grid circuits of the valves 17 and 19 and that impressed upon the grid circuits of the valves 18 and 20, a phase shifting circuit 25 of any of the known types, for example, an impedance phase shifting circuit as illustrated, is connected between the transformer 24 and the source of alternating current 22. In accordance with the customary practice the value of the grid current in the control circuit may be limited by inserting therein the resistors 26, 27, 28 and 29.

In operation, neglecting the leaking reactance of the winding of each leg of the device 13, the windings and capacitors associated with this core structure serve to maintain the total magnetomotive force and that of each of the legs of the magnetic core structure 12 at a substantially constant value. Each of the valves 17, 18, 19 and 20 is conductive for a period equal to 180 electrical degrees. During the time that the valve 17 and one of the valves 18 and 20 are conductive, electrical energy is stored in the circuit comprising the inductor winding 13 and the capacitor 15. After electric valve 17 has been conductive for 180 electrical degrees the current is transferred from this valve to valve 19 which now causes energy to be stored in the inductor winding 14 and the capacitor 16. By means of the phase shift circuit 25, the time of the initiation of conductivity of the valves 18 and 20 is so arranged that each of these valves becomes conductive some time after the valves 17 and 19, respectively, were rendered conductive. This time interval may be any value slightly greater than 0° and slightly less than 180°. It will be obvious, of course, to those skilled in the art that the system will not operate satisfactorily when the time of the ignition of the valve 17 is either in phase with the ignition of the valve 18 or exactly out of phase with this valve because of the constant current output characteristic of the apparatus.

While it is not desired to be limited thereto, it is believed that the above explanation presents in accordance with present knowledge, the most likely theory of operation of the circuit arrangement disclosed herein.

The size of the capacitors 15, 16, the ratio of the upper portion of the windings 13, 14 to the lower portions of the same windings, the phase relation between the control potentials applied to the valves 17, 19 and the valves 18, 20, and the frequency of the alternating current circuit 22 all determine the amount of power transferred between the direct current circuits. By providing means (not shown) for varying the frequency of the source 22, the value of the energy transferred between the two circuits may be readily controlled. While the operation of the circuit disclosed has been described in terms of transferring power from the constant current direct current circuit 10 to the constant potential alternating current 11, it will be apparent to those skilled in the art that energy may be transferred from the alternating current circuit to the direct current circuit and that either of said circuits may have the constant current characteristic and the other circuit will be a constant potential circuit.

In Fig. 2 there are disclosed curves which show the relation between the alternating current voltage and the phase shift between the grid potentials applied to the two groups of tubes under different operating conditions. The curve A represents the change in alternating current voltage in accordance with nearly 180° phase shift when the alternating current load is substantially constant such as a pure resistance load. Curve B, on the other hand, shows how the voltage may be held constant by shifting the grid phase relation in direct proportion to the changes in the load resistance. It will be noted that the curve B is constant to the point P and thereafter this relation can no longer be maintained. This is a desirable feature since it protects the alternating current apparatus at no load and short circuit conditions.

While this invention has been shown and described in connection with certain specific embodiments it will, of course, be understood that it is not to be limited thereto, since it is apparent that the principles herein disclosed are susceptible of numerous other applications, and modifications may be made in the circuit arrangements and in the instrumentalities employed without departing from the spirit and scope of the invention as set forth in the appended claims.

What is claimed as new and desired to be secured by Letters Patent of the United States is:

1. An electric valve converting system for transferring energy between a direct current circuit and an alternating current circuit one of which has a constant current characteristic comprising a two-legged magnetic core structure having a winding on each leg thereof, an energy storage device associated with the winding on each leg to maintain a substantially constant magnetomotive force in said structure, electric valve means interconnecting said windings with said direct current circuit, an alternating current circuit connected between intermediate points on said windings, and means for controlling the conductivity of said valve means.

2. An electric valve converting system for transferring energy between a direct current circuit and an alternating current circuit, one of which has a constant current characteristic, comprising a two-legged magnetic core structure provided with a winding for each leg thereof, a capacitor for each winding connected in parallel thereto, means including an electric discharge valve means interconnecting each of the terminals of said winding with said direct current circuit, means for connecting an alternating current circuit to intermediate terminals on said windings, and means for controlling the conductivity of said valve means.

3. An electric valve converting system for transferring energy between a direct current circuit and an alternating current circuit one of which has a constant current characteristic, comprising a two-legged magnetic core structure having at least one inductive winding on each leg thereof, an energy storage device associated with the inductive winding on each leg to maintain a substantially constant magnetomotive force in said structure, electric valve means interconnecting said windings with said direct current circuit, means for connecting said alternating current load to intermediate points on said winding, means for controlling the conductivity of said valve means, and means for controlling the frequency at which said valve means become conductive.

4. An electric valve converting system for transferring energy between a direct current circuit and an alternating current circuit one of which has a constant current characteristic, comprising a two-legged magnetic core structure, a winding on each leg thereof, an energy storage device associated with the winding on each leg to maintain a substantially constant magnetomotive force in said structure, means including an electric discharge valve means for each terminal of each winding of said structure for interconnecting said windings with said direct current circuit, means for connecting said alternating current circuit to intermediate points on said windings, and means for alternately initiating the conductivities of the valve means associated with each leg of said structure and for controlling the time interval between said initiation of conductivity.

5. An electric valve converting system for transferring energy between a direct current circuit and an alternating current circuit one of which has a constant current characteristic, comprising a two-legged magnetic core structure, an inductive winding for each leg thereof, a plurality of energy storage devices each associated with one of said windings, means including electric discharge valve means for interconnecting each terminal of said winding with said direct current circuit, means for connecting an alternating current circuit to intermediate points on said windings, and means for alternately initiating the conductivity of the valve means associated with each leg so that said periods are concurrent for a portion of each cycle of operation.

6. An electric valve converting system for transferring energy between direct and alternating current circuits, one of which has a constant current characteristic, comprising a two-legged core structure having an inductive winding on each leg thereof, a capacitor for each winding, said capacitors each being arranged to form with its associated winding an energy storage circuit, electric valve means provided with control electrodes, said valve means connecting each terminal of said winding to said direct current circuit, an alternating current circuit connected to intermediate points on said windings, means for alternately energizing the control electrodes of the valve means associated with the winding on each leg of said structure, and means for controlling the frequency of the energization of said control electrodes.

7. An electric valve converting system for transferring energy between direct and alternating current circuits, one of which has a constant current characteristic, comprising a two-legged core structure having an inductive winding on each leg thereof, a capacitor for each winding, said capacitors each being arranged to form with its associated winding an energy storage circuit, electric valve means connecting each terminal of said winding to said direct current circuit, an alternating current circuit connected to intermediate points on said windings, means for alternately initiating periods of conductivity of said valve means associated with each leg so that said periods of conductivity are concurrent for a portion of each cycle of operation, and means for controlling the time interval between said initiation of conductivity.

8. An electric valve converting system for transferring energy between direct and alternating current circuits, one of which has a constant current characteristic, comprising a two-legged core structure having an inductive winding on each leg thereof, a capacitor for each winding, said capacitors each being arranged to form with its associated winding an energy storage circuit, electric valve means connecting each terminal of said winding to said direct current circuit, an alternating current circuit connected to intermediate points on said winding, and means for alternately initiating the periods of conductivity of the valve means associated with each leg so that said periods of conductivity are concurrent for a portion of each cycle of operation.

WILLIAM A. DODGE,
*Administrator of the Estate of Camil A. Sabbah, Deceased.*